US012762359B2

(12) United States Patent
Eswaran et al.

(10) Patent No.: US 12,762,359 B2
(45) Date of Patent: Oct. 13, 2026

(54) SYSTEM AND METHOD OF CALIBRATING HEALTH OF OFF-PLATTER DETECTOR USING INTEGRATED WEIGH PLATTER

(71) Applicant: ZEBRA TECHNOLOGIES CORPORATION, Lincolnshire, IL (US)

(72) Inventors: Pavithra Eswaran, Plainview, NY (US); Joseph F. DiGregorio, Seaford, NY (US); Len Anderson, Bayside, NY (US); Narendra Joshi, Lake Grove, NY (US); Xianping Ren, Merrick, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/737,893

(22) Filed: Jun. 7, 2024

(65) Prior Publication Data

US 2025/0378287 A1 Dec. 11, 2025

(51) Int. Cl.
*G06K 7/00* (2006.01)
*G06K 7/10* (2006.01)
*H04N 23/20* (2023.01)

(52) U.S. Cl.
CPC ....... *G06K 7/0095* (2013.01); *G06K 7/10841* (2013.01); *H04N 23/20* (2023.01)

(58) Field of Classification Search
CPC .......................... G06K 7/0095; G06K 7/10841
See application file for complete search history.

(56) References Cited

U.S. PATENT DOCUMENTS

2015/0242658 A1* 8/2015 Nahill .................. G06K 7/1096 235/438
2023/0267439 A1* 8/2023 Handshaw ............ G01S 7/4865 705/23

* cited by examiner

*Primary Examiner* — Nabil H Syed
(74) *Attorney, Agent, or Firm* — Yuri Astvatsaturov

(57) ABSTRACT

Technologies for assessing a health condition of a light emission assembly and recalibrating the light emission assembly are disclosed. For example, health assessment and recalibration of an imaging system is performed by initially identifying absence of an object at the imaging system, before performing either the assessment or recalibration. For an imaging system having a weigh platter assembly and an off-platter detection assembly serving as the subject light emission assembly, the imaging system performs a health assessment of the detection assembly responsive to a zero weight condition measured at the platter assembly. The imaging system then selectively enters into recalibration, responsive to the health assessment finding a sufficiently degraded light intensity, by measuring reflected light from the detection assembly.

10 Claims, 7 Drawing Sheets

SYSTEM AND METHOD OF CALIBRATING HEALTH OF OFF-PLATTER DETECTOR USING INTEGRATED WEIGH PLATTER

BACKGROUND

Traditionally, bioptic imaging systems may have a weigh platter for weighing an item during a scanning procedure and an off-platter detector assembly for preventing off-platter conditions during that scanning procedure. For example, bioptic imaging systems may detect and prevent off-platter conditions during scale events that could result in an improper weight being reported for a transaction, improper because part of the item is off the platter and thus a proper weight is not registered. In many examples, the imaging system uses an IR (infra-red) beam that reflects off a retro-reflective sticker on the far-side of the weigh platter back into a photo-detecting sensor. If the beam is obstructed by an object, the weigh platter will not proceed until the item is centered on the platter.

To operate effectively, the off-platter detector assembly needs sufficient dynamic range when comparing the baseline return signal strength to a threshold that would indicate an obstruction. However, over time, this baseline return signal can degrade for several reasons: LED intensity reduction due to aging dirty or damaged IR exit window; dirty or damaged retroreflective sticker; dirty platter (some IR signal is reflected off the platter); or malfunctioning circuitry.

As a result, there is a need to detect degradation in an off-platter detector assembly and notify a user to take action. Current imaging systems, without such a solution, can cause the user to experience reduced system performance, false beam break/off-platter alerts, and in some instances total system malfunction without notice.

SUMMARY

Generally speaking, the systems and methods herein utilize an imaging device disposed proximate to an edge of a weighing platter that is configured to capture image data of an environment that may include a tower portion of a bioptic imaging device while the imaging devices within the bioptic imaging device are inactive. This imaging device may then analyze this captured image data determine whether an object satisfies a position threshold relative to the imaging device or the tower portion of the bioptic imaging device. If an object satisfies the position threshold, the imaging device may generate a wakeup signal to active the imaging system, comprised at least in part by the imaging devices within the bioptic imaging device.

In an embodiment, the present invention is imaging system comprising: an imaging assembly within a housing and configured to capture image data of an environment appearing in a field of view (FOV); a weigh platter configured to measure a weight of an object placed on the weigh platter and having a surface extending in a first transverse plane; a light emission assembly having one or more light sources each configured to emit a light beam along the surface of the weigh platter to impinge upon a respective reflector positioned distally from the light emission assembly; and a controller configured to (i) identify a zero weight condition for the weigh platter indicating absence of an object on the weigh platter and (ii) determine a health condition of each of the one or more light sources from a measured intensity of a reflection beam detected from the respective reflector.

In a variation of this embodiment, the controller is further configured to determine the health condition of each light source by: measuring the intensity of the reflection beam detected from the respective reflector; comparing the intensity to a reference intensity predetermined for the light source; and in response to the comparison, determining the health condition of the light source.

In another variation of this embodiment, the health condition of the light source is one of a healthy intensity light source condition, an acceptable intensity light source condition, and an unhealthy intensity light source condition.

In yet another variation of this embodiment, the controller is configured to display a visual indication of the health condition on the imaging system.

In still another variation of this embodiment, the controller is configured to enter a recalibration mode in response to the controller determining the health condition of any of the one or more light sources is at the acceptable intensity light source condition or at the unhealthy intensity light source condition for longer than a degradation window of time, wherein the recalibration mode is for determining new intensity ranges corresponding to one or more of the healthy intensity light source condition, the acceptable intensity light source condition, and the unhealthy intensity light source condition.

In still another variation of this embodiment, the recalibration mode is a manual recalibration mode indicated by a visual indication on the imaging system and configured to allow a user to manually set the new intensity ranges, or an automatic recalibration mode in which the controller is configured to set the new intensity ranges.

In still another variation of this embodiment, the reference intensity is a previously measured and stored intensity.

In still another variation of this embodiment, the reference intensity is a preset intensity or preset intensity fraction.

In still another variation of this embodiment, the controller is configured to identify the zero weight condition for the weigh platter after a first predetermined time window, and wherein the controller is configured to determine the health condition of each of the one or more light sources after a second predetermined time window.

In still another variation of this embodiment, the controller comprises a central controller for the imaging system and one or more remotely positioned controllers communicatively coupled to the central controller.

In still another variation of this embodiment, the central controller is configured to identify the zero weight condition for the weigh platter in response to receiving signal data from the weigh platter; and wherein the one or more remotely positioned controllers are each configured to determine the health condition of a respective one of the one or more light sources from the measured intensity of the reflection beam detected from the respective reflector.

In still another variation of this embodiment, the central controller is configured to identify the zero weight condition for the weigh platter in response to receiving signal data from the weigh platter; and wherein the one or more remotely positioned controllers are each configured to determine the measured intensity of the reflection beam detected from the respective reflector corresponding to a respective one of the one or more light sources and communicate the determined measured intensity to the central controller which is configured to determine the health condition of the respective one of the one or more light sources.

In another embodiment, the present invention is a method for detecting a reflected signal resulting from an illumination source of an imaging device, the method comprising: transmitting an infrared signal from an imaging assembly having an infrared illumination source: receiving, at an imager sensor of the imaging assembly, a reflected infrared signal from a reflector associated with the imaging device; measuring the peak amplitude of the reflected infrared signal during transmission of the infrared signal by the imaging assembly; and responsive to a separate system determining an absence of an object interference with a beam path of the infrared light extending from the infrared illumination source to the reflector, determining a health condition of the imaging assembly.

In a variation of this embodiment, the separate system is a weigh platter of the imaging assembly, the method further comprising determining the absence of the object by analyzing weigh data captured by the weigh platter during the transmission of the infrared signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
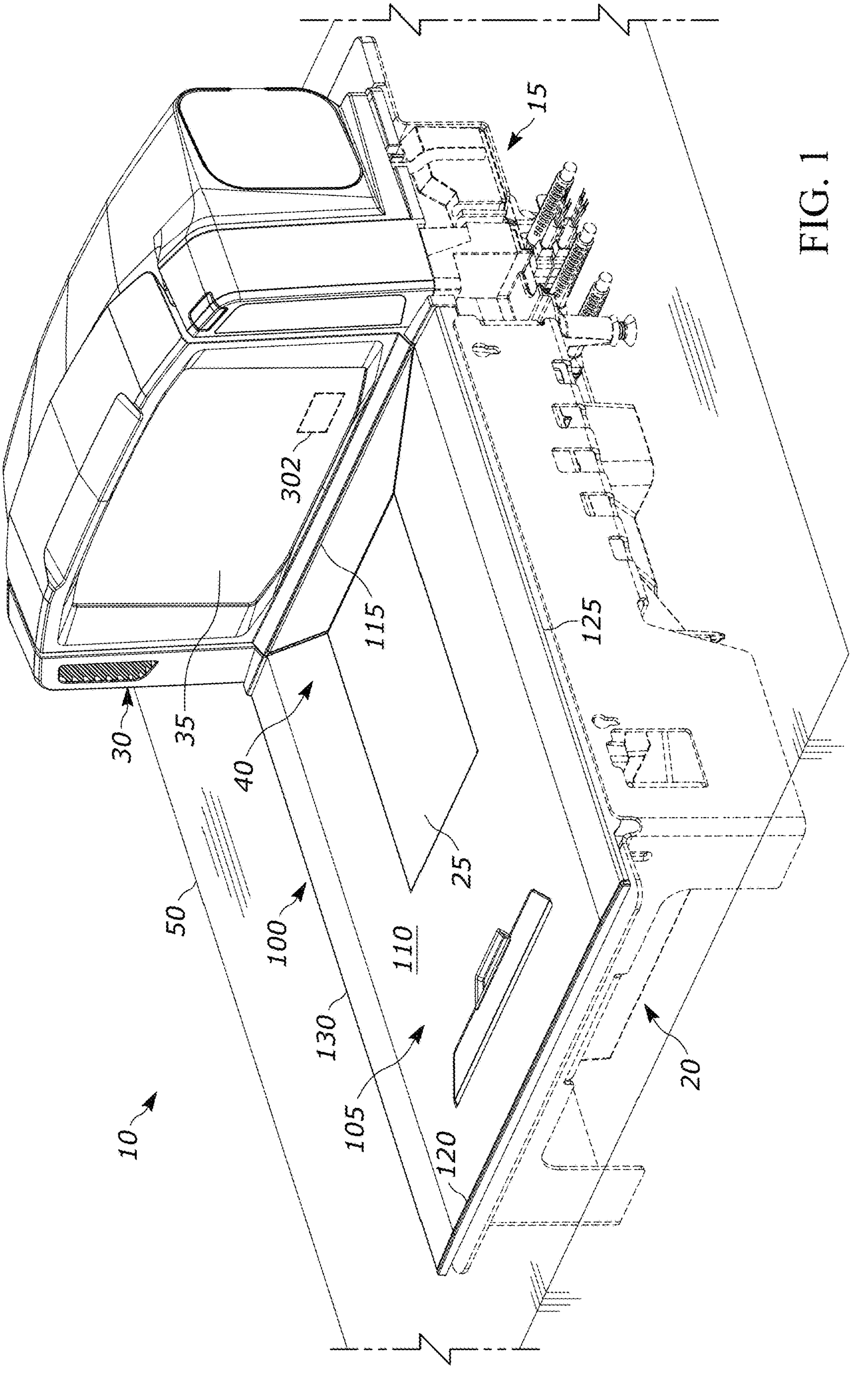
FIG. 1 illustrates a front perspective view of an example imaging system, in accordance with the present techniques.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present techniques describe systems and methods that can overcome the limitations of the prior art by using a health condition process that detects degradation in one or more off-platter detector assemblies through measuring an IR (infrared) signal strength, while also integrating scale status of a weigh platter. The present techniques can control operation of both health condition monitoring and recalibration of off-platter detector assemblies, while minimizing errors that plague conventional systems which are susceptible to unintended, as well as intentional mismeasurements of IR signal strength.

In some examples, the present techniques including imaging systems with imaging assemblies and weigh platters, where a light emission assembly, such as an off-platter detector or other assembly, is configured to emit a light beam along the surface of the weigh platter impinging upon a distally-positioned reflector. A controller of the imaging system may then identify a zero weight condition (or state) for the weigh platter indicating absence of an object on the weigh platter. Once the zero weight condition is present, the controller may then determine a health condition of the light emission assembly, for example, by measuring an intensity of a reflection beam detected from the reflector and comparing it against threshold values/ranges. Depending on the determined health condition, for example, healthy, acceptable but borderline, or unhealthy, the controller may enter the imaging system into a recalibration state where the threshold values/ranges may be manually or automatically revised. The recalibration allows for continued use of the imaging system, but in a more accurate state, for example, a more accurate off-platter detection, when the light emission assembly is part of an off-platter detector assembly.

As used herein, various examples of imaging systems are described has having light emission assemblies that are on a side of a weigh platter or other surface. These light emission assemblies are described as part of an off-platter detection assembly in various examples. It will be appreciated that such off-platter detection assemblies may be used to identify when an object extends off a weigh platter of the imaging system, for example, extending off onto a nearby surface. Such off-platter detection assemblies may communicate detected off-platter weigh conditions to a central controller of the imaging system, to a point-of-sale (POS) system communicatively coupled to the imaging system, or to other systems. However, it will be further appreciated that the techniques herein may be used with any light emission assembly for edge detection/return path detection, in particular that may be operated in conjunction with an integrated weigh platter.

The imaging systems here may be of any number of different types, including a bioptic imaging system, such as illustrated in FIG. 1.

In FIG. 1, an example imaging system 10, in the form of a bioptic barcode reader, is shown configured to be supported by a workstation 50, such as a checkout counter at a point-of-sale (POS) of a retail store. Imaging system 10 has a housing 15 that houses a weigh platter assembly 100 and includes a lower housing 20 and an upper housing 30 that extends above lower housing 20. Upper housing 30 includes a generally vertical window 35 to allow a first set of optical components positioned within housing 15 to direct a first field-of-view through vertical window 35. In addition, if imaging system 10 is a bioptic barcode reader, imaging system 10 will include a generally horizontal window 25, which in the example shown is positioned in a weigh platter 105 of weigh platter assembly 100 to allow a second set of optical components positioned within housing 15 to direct a second field of view through horizontal window 25. The first and second fields of view intersect to define a product scanning region 40 of barcode reader 10 where a product can be scanned for sale at the POS.

Weigh platter assembly 100 of imaging system 10 includes a weigh platter 105 and is configured to measure the weight of an object placed on weigh platter 105. Weigh platter 105 has surface 110 that is generally parallel to a top surface of workstation 50 and extends in a first transverse plane, a proximal edge 115, a distal edge 120, a first lateral edge 125, and a second lateral edge 130. In the example shown, proximal edge 115 is adjacent upper housing 30 and would be the edge furthest from a user of weigh platter assembly 100 and/or imaging system 10. First and second lateral edges 125, 130 extend non-parallel to proximal edge 115. Distal edge 120 is opposite proximal edge 115, would be the edge closest to the user, and extends non-parallel to first and second lateral edges 125, 130. In the example shown, weigh platter 105 is generally rectangular and first and second lateral edges 125, 130 are perpendicular to proximal edge 115 and distal edge 120 is perpendicular to first and second lateral edges 125, 130 and parallel to proximal edge 115.

Figure 2:
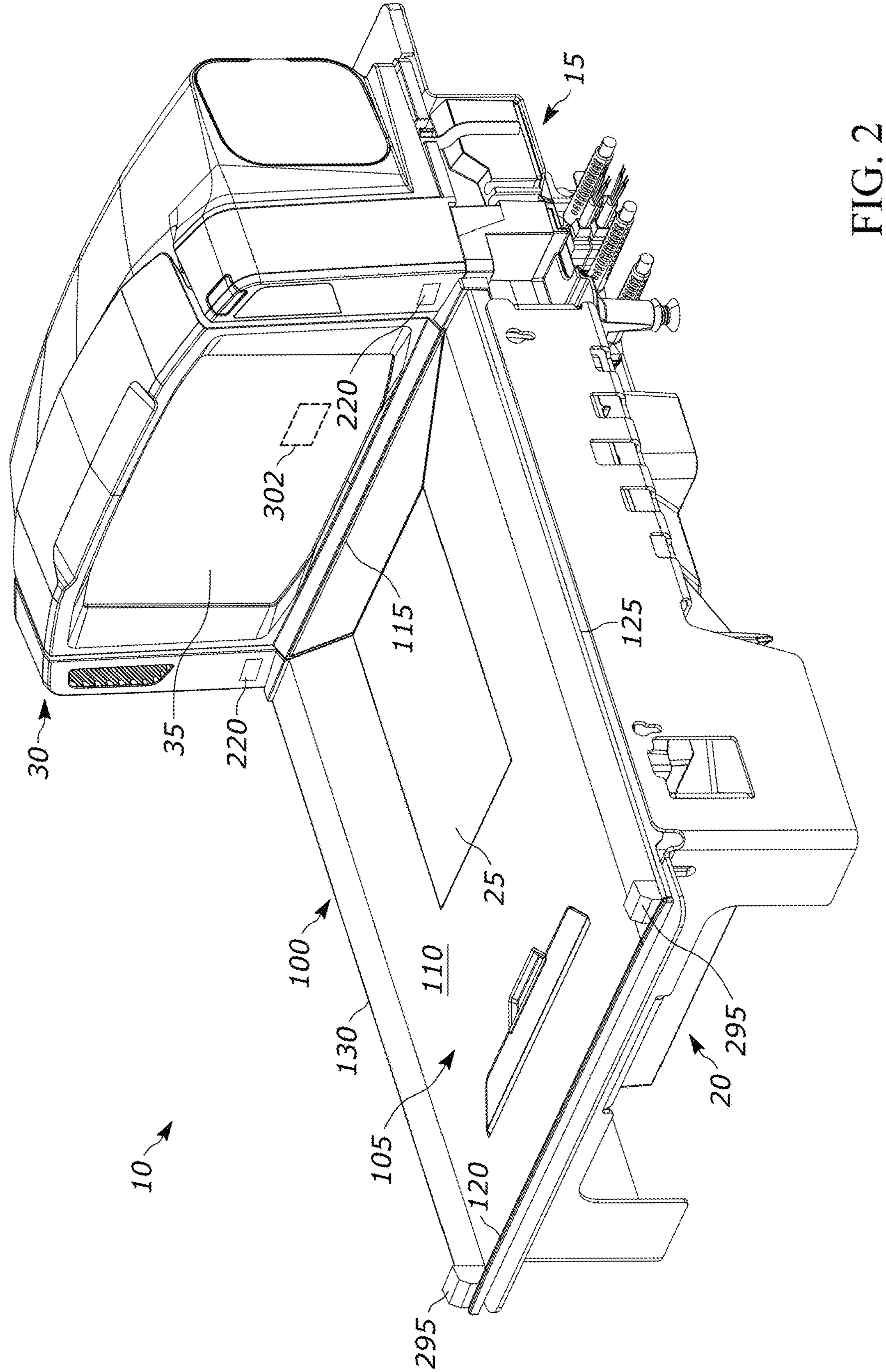
FIG. 2 illustrates a front perspective view of the imaging system of FIG. 1 with a first example off-platter detection assembly.
Figure 3:
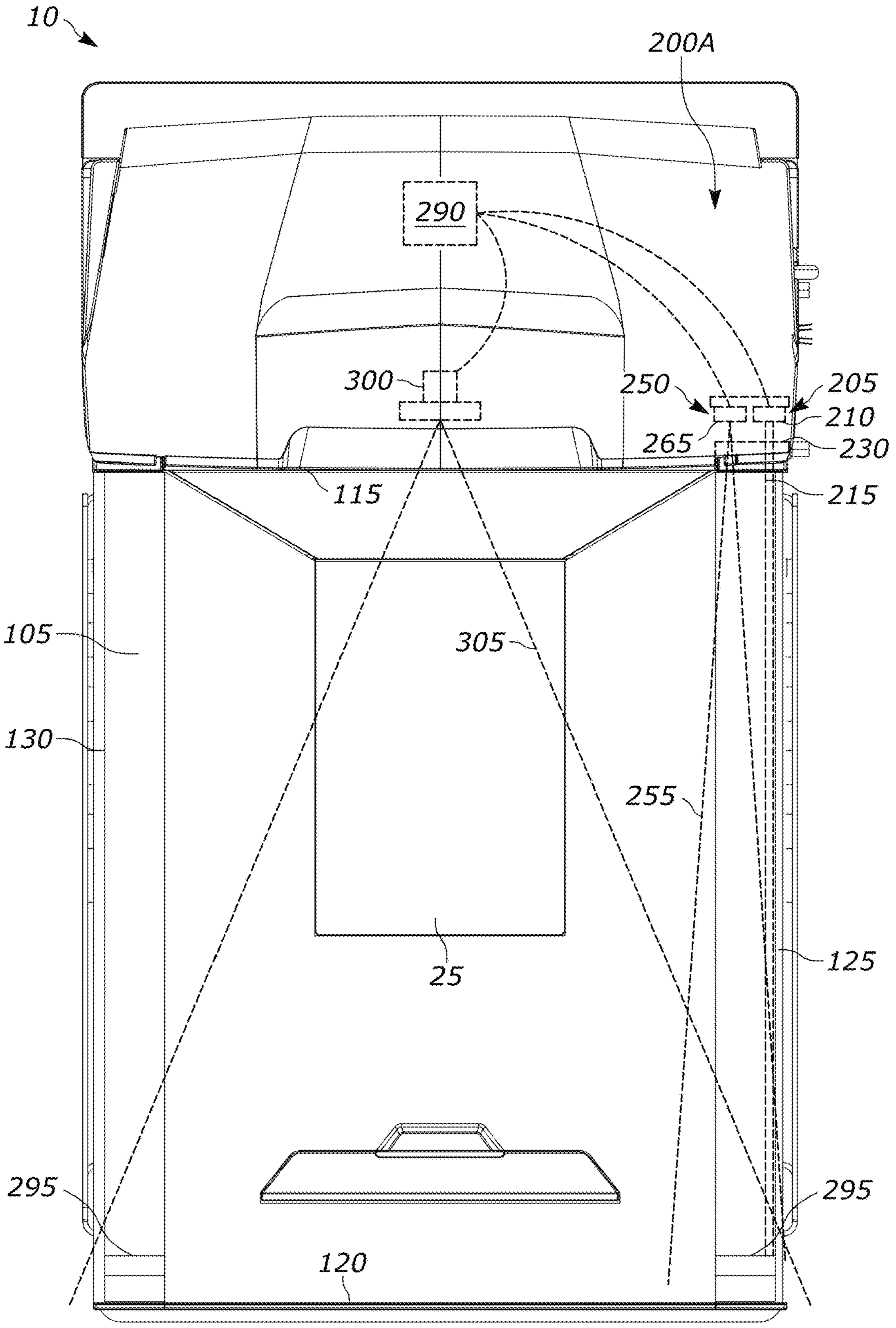
FIG. 3 illustrates a top view of the imaging system of FIGS. 1 and 2.

Referring to FIGS. 2 and 3, the imaging system 10 is illustrated with a first example off-platter detection assembly 200A. The off-platter detection assembly 200A includes a light emission assembly 205, light detection assembly 250, a controller 290 in communication with light emission assembly 205 and light detection assembly 250, and a retroreflector 295 positioned at distal edge 120 of weigh platter 105, opposite light emission assembly 205. For simplicity, only a single light emission assembly 205, light detection assembly 250, and retroreflector 295 along first lateral edge 125 are described herein, however, it will be understood that off-platter detection assembly 200A can also include a second light emission assembly, a second light detection assembly, and a second retroreflector aligned along second lateral edge 130 of weigh platter 105 to detect objects that extend over second lateral edge 130, opposite first lateral edge 125.

In the example shown in FIGS. 2 and 3, the light emission assembly 205 is located within upper housing 30 of housing 15, has a light source 210, and is configured to emit a light 215 through a window 220 and away from proximal edge 115, towards distal edge 120 and retroreflector 295, and along first lateral edge 125 of weigh platter 105. Light source 210 could be an LED that is focused into a narrow beam, similar to an aiming dot used in scanners, a focused laser beam, etc., and light 215 could be pulses of light (such as in a light imaging, detection, and ranging (LIDAR) system) or a continuous light beam and could be on the infrared wavelength, visible light wavelength, or any wavelength desired. Retroreflector 295 can be made of a material and/or color that reflects a wavelength of light 215 back towards proximal edge 115 of weigh platter 105. The retroreflector 295 may be a passive reflector. In some examples, the retroreflector 295 may be replaced with an active reflector, for example, a reflector assembly have its own light detection assembly and light emission assembly, where the active reflector receives an emission from the light assembly 205 and generates a return light emission directed at the light detection assembly 250.

Light detection assembly 250 can also be located within housing 15, behind window 220, and has a field-of-view 255 that extends from proximal edge 115 to at least distal edge 120 and along first lateral edge 125. Light detection assembly 250 has a light sensor 265 and is configured to detect light 215, from one or more pulses of light or a continuous infrared light beam from light emission assembly 205, that is reflected from retroreflector 295 or from an object that extends across light 215, and therefore off weigh platter 105, towards proximal edge 115 and within field-of-view 255. Light sensor 265 can be positioned below or beside light source 210 and could also be located on the same printed circuit board as light sensor 265.

In the illustrated example, the imaging system 10 includes a central controller 290 in communication with light source 210 of light emission assembly 205 and light sensor 265 of light detection assembly 250 and configured to receive a light detection signal from light detection assembly 250. For example, if light emission assembly 205 is configured to emit a continuous light beam, such as a continuous infrared (IR) light beam, from light source 210, the light detection signal from light detection assembly 250 could be a signal strength of the reflected light from retroreflector 295 or object that is detected by light sensor 265.

In a conventional off-platter detection mode, the controller 290 can be configured to determine if an object extends across first lateral edge 125 and off of weigh platter 105 by comparing the light detection signal to a first signal threshold and determining if the light detection signal is less than the first signal threshold. For example, the first signal threshold could be 10 percent of a calibration signal, which would be the signal strength of the light reflected from retroreflector 295 detected by light detection assembly 250 without anything (i.e., an object, dirt, debris, etc.) impeding the path of light 215 from light source 210 to retroreflector 295 and from retroreflector 295 to light sensor 265. The calibration signal for off-platter detection can be set at the factory or on-site during calibration of barcode reader 10. If the light detection signal is greater than the first signal threshold, this indicates that there is no object extending across the first lateral edge 125 between proximal edge 115 and distal edge 120. If the light detection signal is less than the first signal threshold, in the off-platter detection mode, this indicates that there is an object extending across first lateral edge 125 between proximal edge 115 and distal edge 120 and, if controller 290 determines that the light detection signal is equal to or less than the first signal threshold, controller 290 can be configured to execute a first event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

In accordance with the present techniques, the controller 290 can also be configured to assess the health of the off-platter detection assembly 200A, for example, in a health determination mode. Further, the controller 290 can also be configured to enter a recalibration mode that recalibrates operation of the off-platter detection assembly 200A, depending on the assessed health thereof.

To determine a health of the off-platter detection assembly 200A, as discussed in examples herein, the controller 290 can be configured to receive weigh data from the weigh platter assembly 100 and assess whether that weigh data indicates a zero weight condition. A zero weight condition is one in which the measured weigh data indicates that no object is present on the weigh platter 105. For example, a zero weight condition can correspond to a zero value in the weight data or to a value smaller than the lightest object the weigh platter assembly 100 is configured to weigh. The controller 290 may be configured to enter a health determination mode only if the weigh platter assembly 100 returns a zero weight condition for a predetermined period of time (predetermined time window, predetermined number of measurement cycles, etc.). The controller 290 can be configured to determine a health condition of the off-platter detection assembly 200A, for example, by measuring the intensity of a reflection beam detected from the retroreflector 295, comparing that measured intensity to one or more reference intensities or reference intensity ranges; and in response to the comparison, determine the health of the light source 210. Thus, in various examples herein, the health of the light source (or the health of the off-platter detection assembly) is assessed based on a measured intensity of the light emission from a light source. By way of example, the health of the light source may be assessed as healthy, acceptable, or unhealthy, where each of these three health statuses correspond to a different intensity region, for example. That is, when these status represent an intensity condition of a light source, they are a healthy intensity light source condition, an acceptable intensity light source condition, and an unhealthy intensity light source condition, respectively. Merely by way of example, a healthy status may be set as an intensity that is 75% of the original baseline intensity of the light emission after factory calibration. Acceptable status may correspond to a measured intensity that is between 75% and 50% of the original baseline intensity. Unhealthy status may be 50% or lower of the original baseline intensity. The number of health statuses may be two, three, or more. Further the ranges of intensities or percentages of intensities defining these ranges may vary.

To enter the recalibration mode, as discussed in examples herein, the controller 290 can be configured to determine if the health status of the off-platter detection assembly has been identified as unhealthy (e.g., unhealthy intensity light source condition, respectively), indicating that the maximum intensity generated by the light source 210 should be recalibrated to a lower intensity, i.e., that the light source 210 has degraded. Responsive to an unhealthy status indication, the controller 290 can enter the imaging system 10 into a recalibration mode, where the intensity ranges for healthy, acceptable, and unhealthy are adjusted based on the intensity recently measured at the light sensor 265. In various examples, in the recalibration mode, the controller 290 may be configured to adjust stored values of intensities or intensity ranges. In other examples, the controller 290 may be configured to adjust a drive current supplied to drive the light source 210, for example, by increasing the drive current to increase the intensity of the light emission instead of adjusting the intensities or intensity ranges. In addition to or alternatively to adjusting the intensity of the light source (e.g., light emission assembly), the recalibration mode can be configured to awaken a spare emission source (e.g., within the off-platter detection assembly) that will produce an additional light emission that compensates for the intensity degradation of the degraded light source. In such examples, normal off-platter detection may them be performed using two co-located light sources in a light emission assembly.

In either or both the health determination mode or the recalibration mode, the controller 290 can be configured to provide a visual and/or audio alert through imaging system 10 or through a connected external system, such as a point of sale (POS) system. Further, the controller 290 may be configured to prevent the weigh platter assembly 100 from measuring a weight of an object placed on weigh platter 105, and/or to prevent communication of the weight measured by weigh platter assembly 100 with the POS system.

While the imaging system 10 may take many different forms, in the illustrated example, the imaging system 10 includes an imaging device 300, such as a color camera, positioned within housing 15, preferably within upper housing 30 and proximate a top portion of vertical window 35, and in communication with controller 290. Imaging device 300 can have a FOV 305 that encompasses distal edge 120 of weigh platter 105 and retroreflector 295 and controller 290 can be configured to analyze images captured by imaging device 300 and determine if an object is in the FOV 305. In some such examples, the controller 290 may be configured to enter into the health determination mode after the controller 290 determines a zero object condition in captured image data, i.e., if no object is identified in captured image data. Indeed, processes described herein as based on a zero weight condition can be implemented in other examples as a zero object condition. Further still, in some examples, a determination of both a zero weight condition and a zero object condition may be preconditions before entry into a health determination mode.

Further the imaging system 10 may include a display 302 positioned within the upper housing 30, visible through the vertical window 35. That display 302 may be a small digital display, angled relative to a normal of the vertical window 35, to not be visible to a user during normal object scanning, but rather only visible to a user looking into the window 35 from a particular angular direction. In some examples, such small displays are used for displaying error codes only, such as displaying a 7 segment error code (or word) indicating to a user of a state of the imaging system, such as a state of the off-platter detection assembly. In various examples, herein the display 302 is used to display, inter alia, a determined health condition of an off-platter detection assembly. In some examples, the internal display 302 may provide a color coded display, for example, to display a visual indication that is green, orange, or red, in color.

Figure 4:
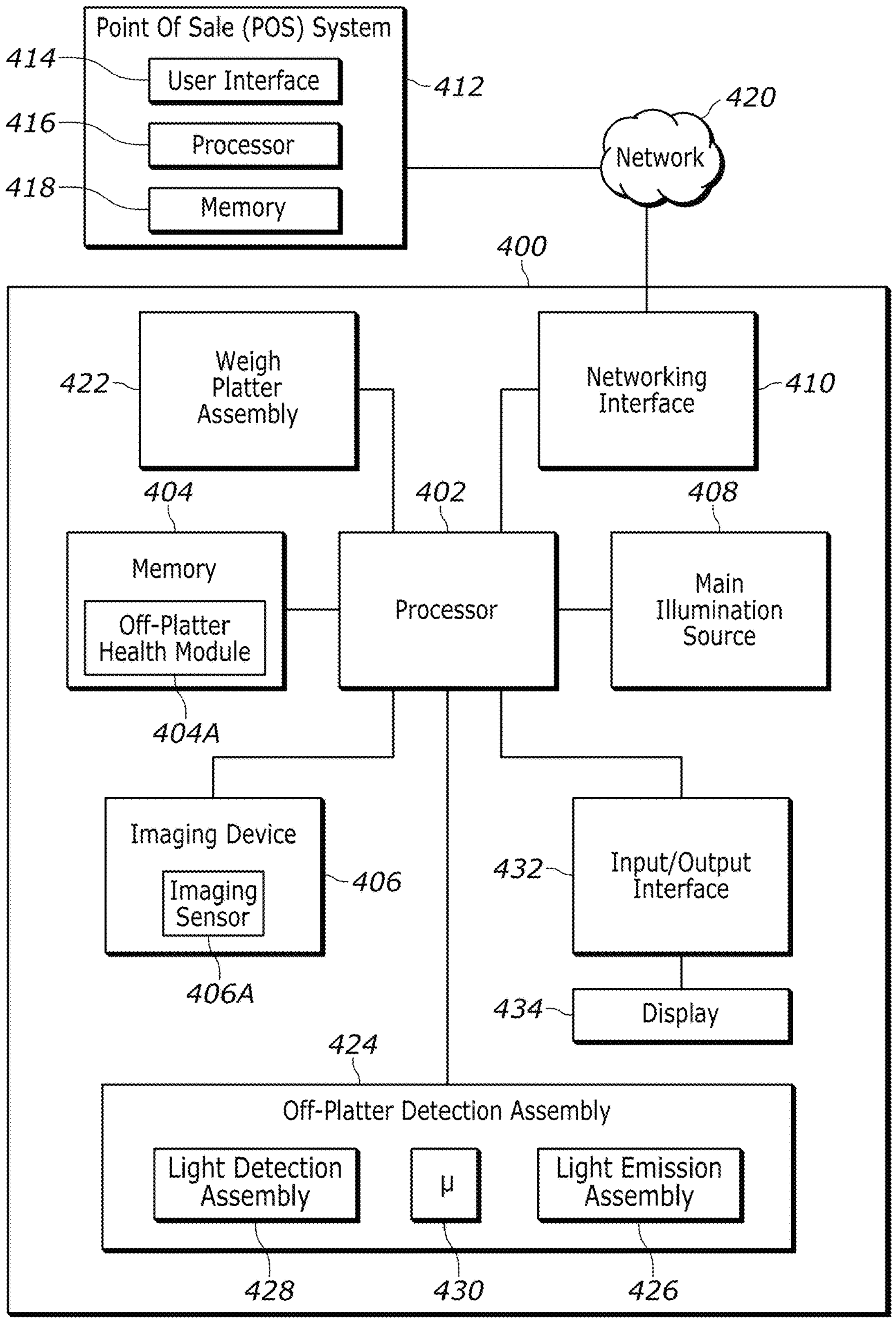
FIG. 4 is a block diagram of an example logic circuit for implementing example methods and/or operations described herein.

FIG. 4 is a block diagram representative of an example logic circuit capable of implementing, for example, one or more components of the example systems and methods described herein. The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs). The processing platform 400 may be an example implementation of the imaging device 10.

The example processing platform 400 of FIG. 4 includes a processor 402 such as, for example, one or more microprocessors, controllers, and/or any suitable type of processor. The example processing platform 400 of FIG. 2 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations represented by the flowcharts of this disclosure. Additionally, or alternatively, machine-readable instructions corresponding to the example operations described herein may be stored on one or more removable media (e.g., a compact disc, a digital versatile disc, removable flash memory, etc.) that may be coupled to the processing platform 400 to provide access to the machine-readable instructions stored thereon.

As an example, the example processor 402 may interact with the memory 404 to access and execute instructions related to and/or otherwise comprising an off-platter health determination module **404*a* capable of entering the platform 400 into a health determination mode and recalibration mode, as described herein. The off-platter health determination module 404***a* may include instructions that cause the processors 402 to perform functions of controller 290 described above. In some examples, the off-platter health module 404A may include instructions that cause the processors 402 to: identify a zero weight condition for the weigh platter indicating absence of an object on the weigh platter and determine a health condition of light sources (e.g., of an off-platter detection assembly) from measured intensity of a reflection beam detected from a retroreflector. The off-platter health module 404*a* may include additional instructions that cause the imaging device to: measure the intensity of the reflection beam detected from the respective reflector; compare the intensity to a reference intensity predetermined for the light source; and in response to the comparison, determine the health condition of the light source. Additional instructions may include assessing the health condition of a light source as a healthy intensity light source condition, an acceptable intensity light source condition, or an unhealthy intensity light source condition. Further, the off-platter health module 404*a* may include additional instructions to enter a recalibration mode in response to determining the health condition of the light sources is at the acceptable intensity light source condition or at the unhealthy intensity light source condition for longer than a degradation window of time. The recalibration mode may include determining new intensity ranges corresponding to one or more of the healthy intensity light source condition, the acceptable intensity light source condition, and the unhealthy intensity light source condition. The recalibration mode may be a manual recalibration mode indicated by a visual indication on the imaging system and configured to allow a user to manually set the new intensity ranges, or an automatic recalibration mode in which the controller is configured to set the new intensity ranges corresponding to the degraded state of the light source.

As illustrated in FIG. 4, an imaging device 406 includes imaging sensor(s) 406*a*. The imaging sensor(s) 406*a* may include one or more sensors configured to capture image data corresponding to a target object, an indicia associated with the target object, and/or any other suitable image data. More generally, the imaging sensor(s) 406*a* may be or include a visual imager (also referenced herein as a “vision camera”) with one or more visual imaging sensors that are configured to capture one or more images of a target object. Additionally, or alternatively, the imaging sensor(s) 406*a* may be or include a barcode scanner with one or more barcode imaging sensors that are configured to capture one or more images of an indicia associated with the target object. Moreover, a main illumination source 408 may generally be configured to emit illumination during a predetermined period in synchronization with image capture of the imaging device 406. The imaging device 406 may be configured to capture image data during the predetermined period, thereby utilizing the illumination emitted from the illumination source 408.

The example processing platform 400 also includes a network interface 410 to enable communication with other machines via, for example, one or more networks. The example network interface 410 includes any suitable type of communication interface(s) (e.g., wired and/or wireless interfaces) configured to operate in accordance with any suitable protocol(s). For example, in some embodiments, networking interface 410 may transmit data or information (e.g., imaging data and/or other data described herein) between the processing platform 400 and any suitable connected device(s).

In the illustrated example, a POS system 412 is communicatively coupled to the processing platform 400 through the network interface 410.

The POS system 412 may be configured to calculate prices of objects to be purchased by users, based on receiving an identification of the object as determined by a product identification system within the processing platform 400 and based on the weight measured by the weigh platter assembly, such as by weigh platter 105. The POS system 412 may include a user interface 414 configured to receive input from users and provide information to users. The POS system 412 may further include one or more processors 416 and a memory 418 (e.g., volatile memory, non-volatile memory) accessible by the one or more processors 416 (e.g., via a memory controller). The one or more processors 416 may interact with the memory 418 to obtain, for example, computer-readable instructions stored in the memory 418. The computer-readable instructions stored in the memory 418, when executed by the one or more processors 416, may cause the one or more processors 416 to monitor the current weight measured by the weigh platter assembly, e.g., based on data sent from the weigh plater 105 via a network 420. Furthermore, the computer-readable instructions stored on the memory 418 may further include instructions for calculating a weight-based price for each object to be purchased based on the identification of the object and the weight measured by the weigh platter assembly. That is, the computer-readable instructions stored on the memory 418 may cause the POS system 412 to access a database listing prices per unit weight for the identified object, and may calculate the price of the object based on the price per weight and the weight at the time when the indication of the identification of object is received.

Additionally, in some examples, the computer-readable instructions stored on the memory 418 may further include instructions for receiving indications of an imaging system being in a health determination mode or a recalibration mode, e.g., via the network 420, and displaying audible and/or visible notifications to a user in instances in which an off-platter detection assembly is determined as having a predetermined health status, such as acceptable health or unhealthy.

The processing platform may further include weigh platter assembly 422, e.g., having a weigh platter, and one or more off-platter detection assemblies 424.

The weigh platter assembly 422 may monitor the weight of objects placed on a weighing platter associated with the checkout workstation and may continuously or periodically log and send the monitored weights to the POS system 412, e.g., via the network 420.

Each of the one or more off-platter detection assemblies 424 may include a light emission assembly 426 and a light detection assembly 428, which may be examples of the light emission assembly 205 and the light detection assembly 250 of FIG. 3. For simplicity, only a single light emission assembly 426 and only a single light detection assembly 428 are shown and described herein, however, it will be understood that off-platter detection assembly 424 can also include any number and/or type(s) of light emission assemblies, and any number and/or type(s) light detection assemblies may be implemented to detect off-platter weigh condition on different sides of the weigh platter assembly 422. In the illustrated example, the off-platter detection assembly 424 includes a dedicated, low resource processor 430, which may include a memory (not shown), configured to implement operations of the example methods herein.

The example processing platform 400 also includes input/output (I/O) interfaces 432 to enable receipt of user input and communication of output data to the user, for example, on an embedded display 434 within a housing of the imaging system.

Figure 5:
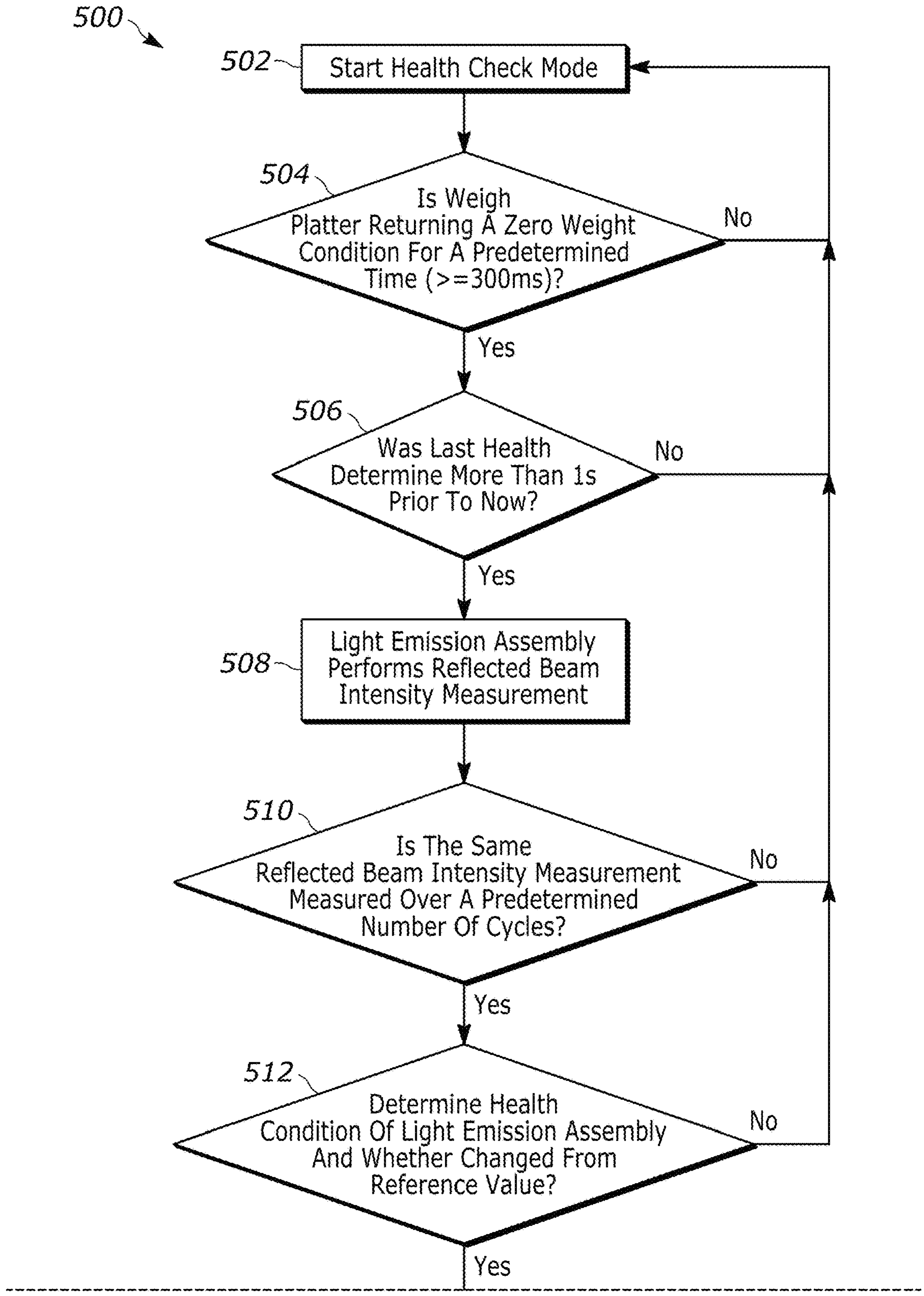
FIG. 5 illustrates an example method for performing a health check on an off-platter detection assembly, based on detecting a reflected signal resulting from an illumination source of an imaging device, during a health determination mode.
Figure 5:
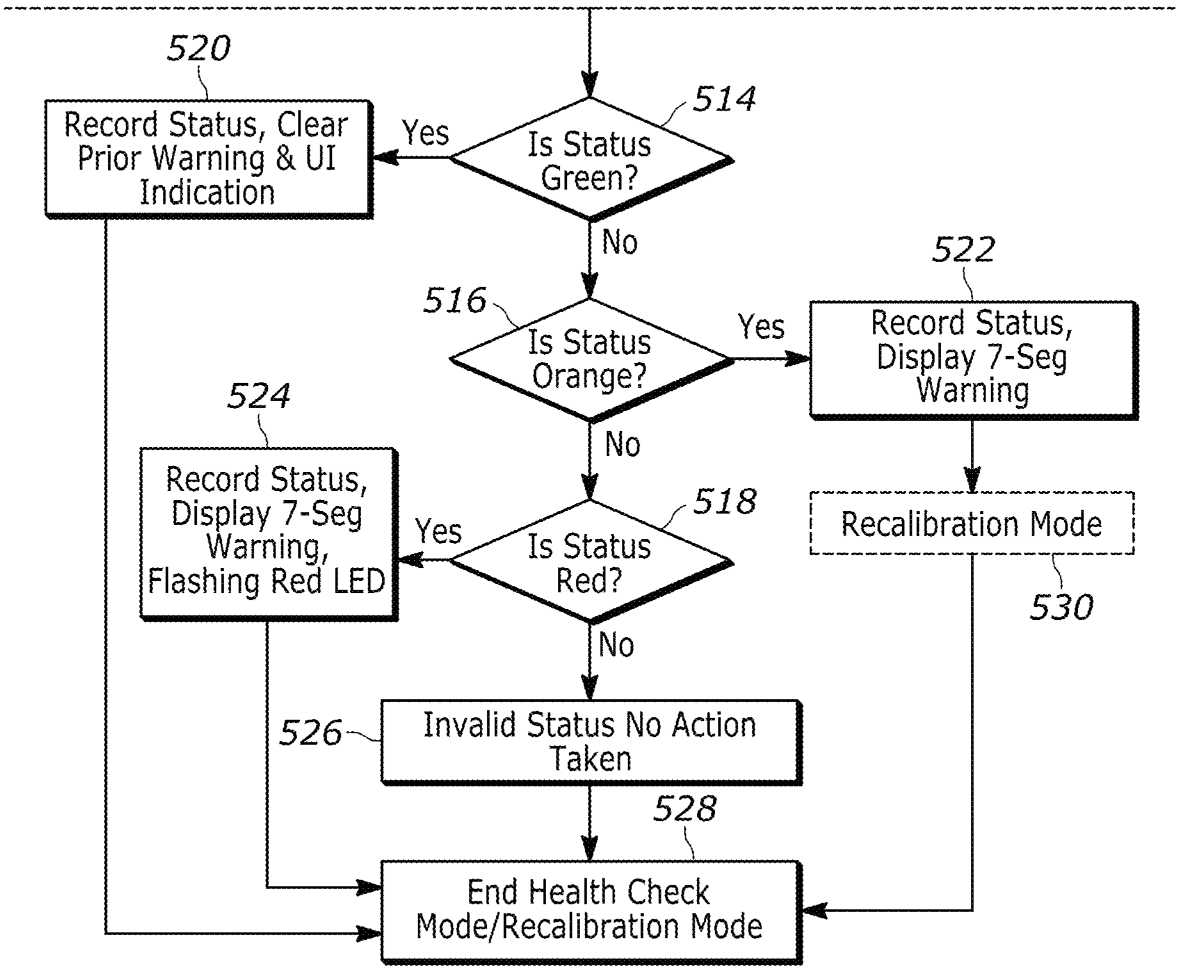

FIG. 5 illustrates an example method 500 for performing a health check on an off-platter detection assembly, based on detecting a reflected signal resulting from an illumination source of an imaging device, in accordance with embodiments disclosed herein. It should be appreciated that the actions described herein in reference to the example method 500 of FIG. 5 may be performed by any suitable components described herein, such as the imaging system 10, processing platform 400, and/or combinations thereof.

At block 502, the imaging system enters a health check mode, as an example implementation of a health determination mode. That health check mode can be for performing a health determination of an off-platter detection assembly, as described in various examples here. Although, more broadly, the health check can be for performing a health determination of any imaging assembly within an imaging system where an intensity of an emitted light can be measured and where coordinating said measurement with the state of a weigh platter assembly is advantageous. The block 502 may be initiated manually by an operator, such as by engaging a calibration button on an imaging system (for example, on a vertical housing 35 of the imaging system 10). The block 502 may be initiated automatically, for example, where an imaging system is configured to periodically enter a health check mode.

The health check mode assesses the health condition of an illumination source through assessing performance, to determine if the heath of the illumination source has degraded to a point where recalibration of the illumination source is warranted.

To coordinate the health determination with the status of weigh platter, at a block 504 the method 500 determines if the weigh platter registered zero weight, meaning no object is present that might be on or near the imaging assembly to prevent a proper measurement of the intensity of light emitted from an illumination source. In the illustrated example, a controller, such as the controller 290 or the processor 402, receives weigh data from the weigh platter of a weigh platter assembly, such weigh platter assembly 105 or weigh platter assembly 422. In the illustrated example, a number of determinations may be made at block 504, including that the weigh data is a null value, zero value, or other measured value indicating that no object is present on the weigh platter. To avoid erroneously determining a zero weight when an object is subsequently placed on the weigh platter, the block 504 may also determine if the zero weight condition is present for a first predetermined time window, which in the illustrated examiner is 300 ms although any predetermined time window may be sufficient. If the conditions are met, the method 500 passes control to a block 506, otherwise control is returned to the health check mode initiating block 502.

At block 506, another predetermined time window is applied to prevent the health check mode from performing a health determination of the illumination assembly if sufficient time has not passed since the last health determination of that illumination assembly. In the illustrated example, the predetermined time window is 1 s, although any predetermined time window may be sufficient. If the conditions are met, the method 500 passes control to a block 508, otherwise control is returned to the health check mode block 502.

At block 508, the health check mode enters into a light emission assembly measurement mode, in which a controller, such as controller 290 or processor 402, instructs an off-platter detection assembly, such as or off-platter detection assembly 424, to measure an intensity of a reflection beam detected from a reflector, such as the retroreflector 295, and measured as a light sensor assembly, such as light detection assembly 250 or light detection assembly 428. In some examples, the block 508 instructs the off-platter detection assembly to emit a beam, after which the reflection beam is measured. In the illustrated example, the block 508 receives a series of successive measurements of the intensity of the reflection beam, storing each, and a block 510 determines if the same intensity value has been measured over a predetermined number of cycles, 5 cycles in the illustrated example. Imposing such a cycle requirement allows the method 500 to minimize using false intensity measurements to determine health of the off-platter detection assembly. If the block 510 determines that the same intensity values are not measured by the off-platter detection assembly over the cycle window, the control is passed back to block 502, otherwise control passes to block 512. The block 510 may allow for differences in measured intensity within a tolerance of each other, such as +/−5%.

To assess for changes in measured intensity, at the block 512, the method 500 compares the measured intensity of the reflection beam from block 510 to a reference intensity predetermined for the off-platter detection assembly. That reference intensity may be a previously measured and stored intensity, or a preset intensity or preset intensity fraction, for example. Thus, method 500, through blocks 502-512, can identify a zero weight condition for a weigh platter indicating absence of an object on the weigh platter and determine a health condition of each of the one or more light sources from a measured intensity of a reflection beam detected from the respective reflector. The determination of the health condition can be achieved by measuring the intensity of the reflection beam detected from the respective reflector; comparing the intensity to a reference intensity predetermined for the light source; and in response to the comparison, determining the health condition of the light source.

In various configurations, the zero weight condition is determined at the weigh platter assembly which sends to a central control the zero weight condition, while in other configurations, the weigh platter assembly may send raw measured weigh data to that central controller which may determine the existence of a zero weight condition. Likewise, in various configurations, the health condition of the off-platter detection assembly may be determined by a central controller, such as the controller 290 or the processor 402, or by one or more remotely positioned controllers, such as the processor 430.

If the block 512 determines that the health condition is the same as previously recorded or, in other examples, that the measured intensity has not changed from a reference intensity, then control is passed to block 502, otherwise the determined health condition is provided to a series of additional blocks for providing a visual display of the health condition.

In some examples, to determine the health condition of the off-platter detection assembly or any other suitable light emission assembly, the block 512 compares the measured intensity of block 510 to a reference intensity. If the measured intensity is less than the reference intensity, which will indicate some amount of degradation, then the block 512 can apply a heuristic to determine how much degradation has occurred and which health condition does that degradation correspond to. In the illustrated example, the determined health condition corresponds to one of three different states: healthy intensity light source condition ("green"), acceptable intensity light source condition ("orange"), and unhealthy intensity light source condition ("red"). An example heuristic would be to apply a percentage fall off from a factory established maximum intensity of a light emission assembly, i.e. a baseline original intensity serving as the reference intensity. For example, a "green" health status may be a measured intensity within 75% or greater of the reference intensity, an "orange" health status may be a measured intensity within 75% to 60% of the reference intensity, and an "red" health status may be a measured intensity of 50% or less of the reference intensity. The heuristics may be based on percentage ranges or intensity value ranges. These ranges may abut one another, or they may be spaced apart from one another, and they ideally would not overlap with one another. The heuristics may define the number of health conditions that a light emission assembly may have, at least two states, while three or more may be preferred. Further the heuristics may be established and stored at the factory, for example, stored in the off-platter health module 404A. In other examples, the heuristics may be stored at a remote processor, such as a dedicated processor of the light emission assembly, as in the example of process 430 of the off-platter detection assembly 424. Thus, in some examples, the determine of the health condition of the light emission assembly may be determined at a remote processor which then communicates the determined health condition to a central controller of the imaging system.

From the block 512, the method performs a series of checks for the health condition, via block 514 which checks whether the health condition is "green", block 516 which checks whether the health condition is "orange", and block 518 which checks whether the health condition is "red", where different actions may be taken. If block 514 identifies the health condition is "green" control is passed to a block 520 that records the status (e.g., in the off-platter health module 404*a*) and clears any previously stored indication of a lesser health condition, such as "orange" or "red". The block 520 may further instruct display of the "green" status to a user, for example, through a display at the imaging system. If block 516 identifies the health condition is "orange" control is passed to block 522, where the status is stored (e.g., in the off-platter health module 404*a*) and a warning display is provided at the imaging system. That warning display may be color coded display, an alphanumeric display, a coded number, or other indication to a user that the health condition of the light emission assembly is in warning state, indicating sufficient degradation that a user may desire to enter a recalibration mode. If the block 518 identifies the health condition as "red" control is passed to block 524, where the status is stored (e.g., in the off-platter health module 404*a*) and a warning display is provided at the imaging system indicating the light emission assembly has degraded to a point that is it no longer operational for off-platter detection. The warning display may be color coded display, an alphanumeric display, a coded number, or other indication, as well as a separate flashing LED display indicating the severity of the determined health condition. If, for reason, none of the blocks 514, 516, and 518 are satisfied, control is passed to a block 526 that indicates the health check was invalid and no further action is taken. The heath determination mode of method 500 ends at block 528.

In some embodiments, the method 500 can allow for switching from a health determination mode to a recalibration mode, for example, in response to determining the health condition of the light emission assembly is at an acceptable intensity light source condition ("orange") and/or at the unhealthy intensity light source condition ("red") for longer than a degradation window of time. In the recalibration mode, a new health heuristic may be determined, e.g., new intensity ranges corresponding to one or more of the healthy intensity light source condition, the acceptable intensity light source condition, and the unhealthy intensity light source condition.

In certain embodiments, recalibration mode is a manual recalibration mode indicated by a visual indication on the imaging system and configured to allow a user to manually set the new intensity ranges. In certain other embodiments, the recalibration mode is an automatic recalibration mode in which the controller is configured to set the new intensity ranges.

In the illustrated example of FIG. 5, the method 500 includes an optional recalibration block 530. The block 530 may automatically determine if the imaging system should enter a recalibration mode based on the determined health conditions. For example, the block 530 may determine if the off-platter detection assembly has received an "orange" status as the health condition repeatedly for a predetermined degradation window of time, such as for a certain number of minutes, hours, or days. If the "orange" status has been determined for longer than that degradation window of time, a recalibration mode is automatically entered to recalibrate the reference intensity of the light emission assembly, establishing new benchmarks for future assessments of health.

The block 530 may trigger entry into recalibration mode in other ways. For example, block 530 may determine a rate of degradation over time by analyzing and comparing the actual measured intensity from block 510. In some such examples, block 530 may compare measure intensities over time, perform a linear line fit, a percentage change, or other algorithmic analysis, and based on that comparison enter into the recalibration mode when a predetermined condition is set. In some examples, block 530 may be configured to allow for only a single recalibration (or other limited number) of the light emission assembly. That is, the method may allow for a degraded light emission assembly to be recalibrated for continued operation without false off-platter detection measurements, but the method may limit the number of times that such recalibration can occur.

In some examples, block 530 triggers entry into recalibration mode in response to manual trigger, for example, from a user pressing a button on imaging assembly after seeing a visual display of an "orange" or "red" health condition. In some examples, manual trigger of the recalibration mode is limited to a certain time window after display of the health condition.

While an optional recalibration block 530 is shown, a similar optional recalibration block may be provided for the "red" status pathway, i.e., after block 524. Such optional recalibration block may operate similar to block 530. However, in the illustrated example, method 500 is configured such that "red" status value indicates too great of a degradation to allow for recalibration, and thus no calibration block is shown.

Figure 6:
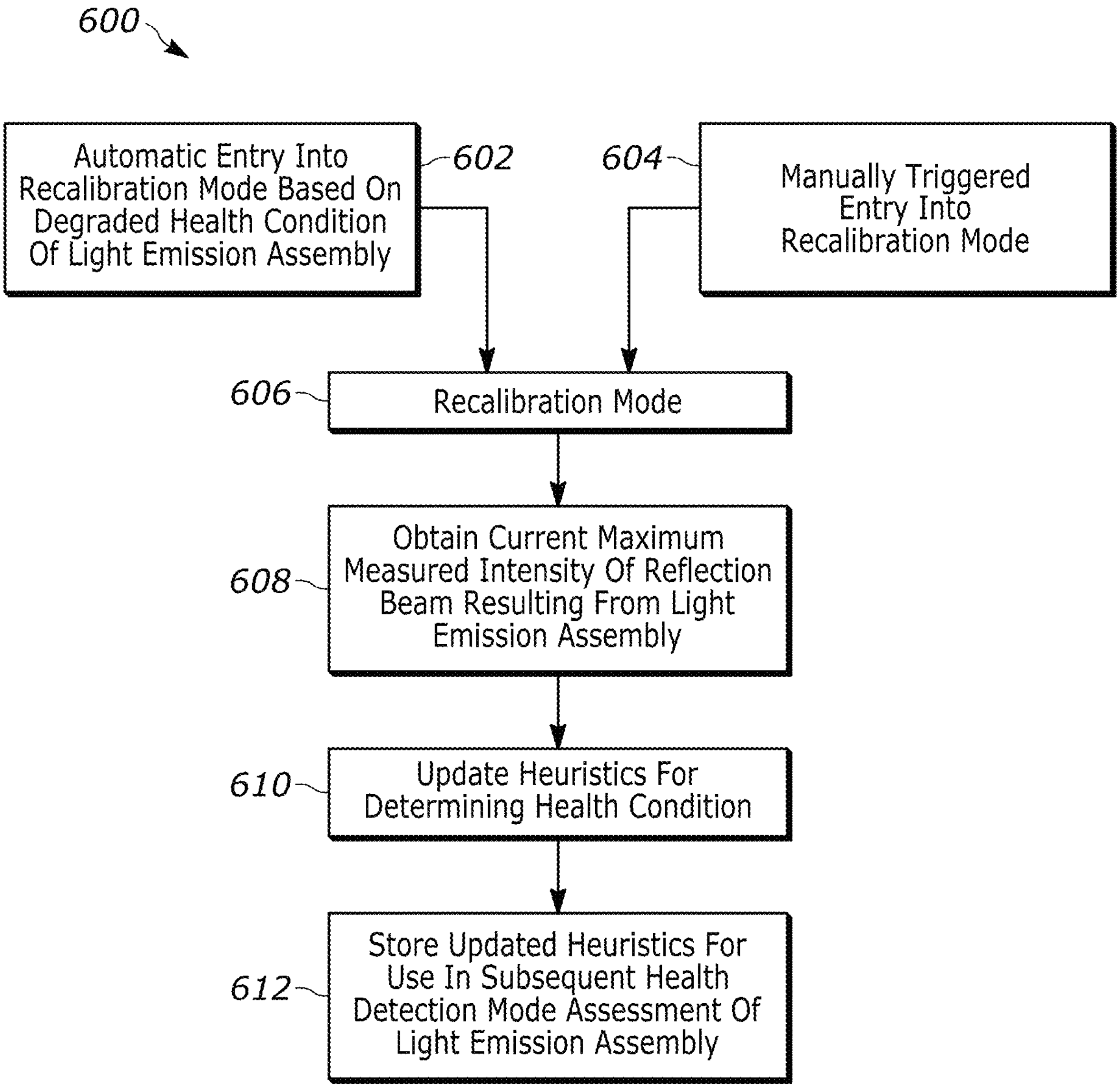
FIG. 6 illustrates an example method for performing a recalibration mode for an off-platter detection assembly, in response to a health check performed during a heath determination mode.

FIG. 6 illustrates an example method 600 for performing a recalibration mode for an off-platter detection assembly, based on the health conditions determined during a heath determination mode, such as shown in method 500 of FIG. 5. As with method 500, method 600 may be implemented by the off-platter health module 404A, for example.

Two different entry points are illustrated: an automatic entry (block 602) into the recalibration mode based on degraded health condition data, such as described above regarding block 530, or a manually triggered entry (block 604) into recalibration mode. In various embodiments, both entry points are provided by the imaging system. The recalibration mode is initiated, in response to the entry point request, at block 606.

In the recalibration mode, method 600 obtains the last measured intensity of the reflection beam resulting from light emission assembly (block 608). This measured intensity represents a new maximum intensity of that light emission assembly. At block 610, method 600 updates the heuristics for determining health conditions for the light emission assembly of the off-platter detection assembly. For example, block 610 may set new intensity ranges for the different health condition states, "green", "orange", or "red". For example, a stored baseline intensity (or reference intensity) may be replaced with the measured intensity, which then becomes the updated baseline (or reference) intensity. The block 610 may set new intensity percentages for the different health condition states. The block 610 may set new intensity ranges or intensity percentages for only certain health conditions. For example, the block 610 may be configured to retain the same intensity ranges as originally set from the factory, for both the "green" and the "red" health condition states, but only against the heuristic for determining an "orange" state.

The updated heuristics are stored at block 612 for use by method 500 in subsequent health determinations.

Various modifications of the processes described in methods 500 and 600 may be implemented.

In some embodiments, the recalibration mode can be configured to determine a new supply current value for driving the light emission assembly, to ensure that the maximum intensity of emitted light is at or within a desired range of the baseline maximum intensity indicating a healthy intensity light source condition. In some embodiments, the recalibration mode can be configured to adjust an emission frequency (wavelength) of the emitted light, for example, adjusting the light emission assembly to emit over a different range in the infrared wavelength region, based on the health condition. In some embodiments, the recalibration mode can be configured to adjust a pulsing frequency of the emitted light, based on the health condition.

In embodiments herein referencing a zero weight condition, it will be understood that such zero weight condition, indicating the absence of an object on an imaging system platter, may be replaced by other modalities of detecting absence of an object. For example, a main imaging device (such as the imaging device 300 or the imaging device 406) may capture image data over a FOV that includes the platter of the imaging system. Or, in another example, a second imaging device such as an overhead imaging device having a FOV pointing downward and spanning the platter may be used. Upon assessing the captured image data and determining no object is within the captured image data, the imaging system may return a zero object condition to a controller, and the controller may use that zero object condition as a proxy for the zero weight condition data described above. In some such embodiments, a zero weight and zero object may both be required for the health check process to continue.

In various embodiments, the health conditions include a lowest health state, termed in "red" state in examples above. The systems and methods herein may be configured such that the lowest health state of an off-platter detection assembly excludes a zero value for the measured intensity, given that if no reflection beam intensity is measured that may mean the emitted light from the light emission assembly has been completely blocked. Thus, the systems and methods may be configured to end the health determination mode if a zero intensity is measured during a health check. Further, the systems and methods may require a zero weight state through the entire health check process, so that if an object is subsequently detected on the weigh platter, even after the predetermined time but before method 500 is completed, method 500 may be configured to automatically exit the health check mode.

As discussed, in various embodiments, the operations of the methods herein may be performed in a distributed manner, with certain operations performed on a remote processors such as processors localize at each off-platter detection assembly, and certain other operations performed on a centralized processor, such a central controller of an imaging system. In certain embodiments, operations described as performed at the remote processors may instead be performed at a centralized processor, and vice versa. For example, instead of determining a health condition at the off-platter detection assembly, raw data may be collected from the off-platter detection assembly and sent to the central controller which may determine the health condition. The central controller may compare measured intensity values against previously measured intensity values or a reference intensity.

While one off-platter detection assembly is described in various embodiments, it will be appreciated that an imaging system may include numerous off-platter detection assemblies, and the methods herein may be applied to each of those assemblies at the same time or at different times. Further, in various embodiments, if a recalibration mode is entered, whether automatically or manually, and one off-platter detection assembly is recalibrated, then each other off-platter detection assembly may be recalibrated such that the same heuristics for health checking are applied to each. An advantage of such a configuration is that each off-platter detection assembly may be updated to apply the same maximum intensity value when measuring an off-platter detection event.

Descriptors "green", "orange", and "red" have been used to qualitatively describe different health condition states determinable by the systems and methods herein. These descriptors are provided for example and for ease of explanation. The techniques herein may be implemented with any number of health condition states and those states may reflect any predetermined levels of degradation.

The methods herein performing health determinations through detecting a reflected signal resulting from an illumination source of an off-platter detection assembly may be used to override off-platter detection operations of the assembly altogether. For example, an off-platter detection assembly may be configured to use a zero weight or zero object detection to override use of the off-platter detection. In some such examples, instead of measuring a reflected signal intensity for detecting an off-platter condition, which would indicate the presence of an object extending off the platter, the assembly may be configured to prevent such detection if the assembly has received a signal from a central controller of the imaging system that there is a zero weight or zero objection detection. In this way, the weigh platter assembly can be integrated not only for controlling operation of a health determination mode, but also in controlling operation of the normal off-platter detection mode of the assembly. In some embodiments, a detection of zero weight state or a zero object state may trigger operations other than the health check of a health determination mode. For example, a zero weight state that occurs simultaneously with a measure reflected signal intensity indicating any amount of degradation, may first trigger another operation, such as capturing imaging data from a FOV of a main imaging device, and assess the results from that other operation, before entering a health check as described in FIG. 5.

In some embodiments, the distally positioned reflector may be replaced with a distally positioned light detection assembly that measures an intensity of the emitted light from the off-platter detection assembly. For example, the retroreflector 295 may be replaced with a light detection assembly, acting as an active reflector. In some such examples, the light detection assembly sends its measured intensity data, via electronic connection, back to the off-platter detection assembly for determining a health condition. In some embodiments, the light detection assembly may be accompanied with a light emission assembly that emits a returned light emission back to the off-platter detection assembly, where that returned light emission indicates a measured intensity of the emitted light from the off-platter detection assembly. Indeed, any of the above methods may be implemented with such an active reflector, allowing for various operations of the methods to performed at one or more of the off-platter detection assembly, the remotely-positioned active reflector assembly, and the central controller. Furthermore, having an active reflector assembly could allow an imaging system to compensate for signal degradation, by adjusting the intensity of the returned light emission in a recalibration mode. That is, the recalibration made may be configured to adjust an intensity of the returned light emission as a compensation for degradation in the emitted light from the off-platter detection assembly.

It is noted that the systems and methods here may be agnostic to the length of the platter, i.e., to the distance between the off-platter detection assembly and the reflector, whether a passive reflector such as a retroreflector or an active reflector assembly.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, rearranged, or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term “logic circuit” is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms “tangible machine-readable medium,” “non-transitory machine-readable medium” and “machine-readable storage device” is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms “tangible machine-readable medium,” “non-transitory machine-readable medium” and “machine-readable storage device” is expressly defined to exclude propagating signals. That is, as used in any claim of this patent, none of the terms “tangible machine-readable medium,” “non-transitory machine-readable medium,” and “machine-readable storage device” can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system comprising:

an imaging assembly within a housing and configured to capture image data of an environment appearing in a field of view (FOV);

a weigh platter configured to measure a weight of an object placed on the weigh platter and having a surface extending in a first transverse plane;

a light emission assembly having one or more light sources each configured to emit a light beam along the surface of the weigh platter to impinge upon a respective reflector positioned distally from the light emission assembly; and a controller configured to (i) identify a zero weight condition for the weigh platter indicating absence of an object on the weigh platter and (ii) determine a health condition of each of the one or more light sources from a measured intensity of a reflection beam detected from the respective reflector, wherein the light emission assembly and the respective reflector form a portion of an off-platter detection assembly configured to detect an off-platter condition associated with the imaging system wherein the controller is further configured to determine the health condition of each light source by:

measuring the intensity of the reflection beam detected from the respective reflector;

comparing the intensity to a reference intensity predetermined for the light source; and in response to the comparison, determining the health condition of the light source, wherein the health condition of the light source is one of a healthy intensity light source condition, an acceptable intensity light source condition, and an unhealthy intensity light source condition, wherein the controller is configured to enter a recalibration mode in response to the controller determining the health condition of any of the one or more light sources is at the acceptable intensity light source condition or at the unhealthy intensity light source condition for longer than a degradation window of time, wherein the recalibration mode is for determining new intensity ranges corresponding to one or more of the healthy intensity light source condition, the acceptable intensity light source condition, and the unhealthy intensity light source condition, and wherein the recalibration mode is a manual recalibration mode indicated by a visual indication on the imaging system and configured to allow a user to manually set the new intensity ranges, or an automatic recalibration mode in which the controller is configured to set the new intensity ranges.

2. The imaging system of claim 1, wherein the controller is configured to display a visual indication of the health condition on the imaging system.

3. The imaging system of claim 1, wherein the reference intensity is a previously measured and stored intensity.

4. The imaging system of claim 1, wherein the reference intensity is a preset intensity or preset intensity fraction.

5. The imaging system of claim 1, wherein the controller is configured to identify the zero weight condition for the weigh platter after a first predetermined time window, and wherein the controller is configured to determine the health condition of each of the one or more light sources after a second predetermined time window.

6. The imaging system of claim 1, wherein the controller comprises a central controller for the imaging system and one or more remotely positioned controllers communicatively coupled to the central controller.

7. The imaging system of claim 6, wherein the central controller is configured to identify the zero weight condition for the weigh platter in response to receiving signal data from the weigh platter; and wherein the one or more remotely positioned controllers are each configured to determine the health condition of a respective one of the one or more light sources from the measured intensity of the reflection beam detected from the respective reflector.

8. The imaging system of claim 6, wherein the central controller is configured to identify the zero weight condition for the weigh platter in response to receiving signal data from the weigh platter; and wherein the one or more remotely positioned controllers are each configured to determine the measured intensity of the reflection beam detected from the respective reflector corresponding to a respective one of the one or more light sources and communicate the determined measured intensity to the central controller which is configured to determine the health condition of the respective one of the one or more light sources.

9. A method for detecting a reflected signal resulting from an illumination source of an imaging device, the method comprising:

transmitting an infrared signal from an imaging assembly having an infrared illumination source:

receiving, at an imager sensor of the imaging assembly, a reflected infrared signal from a reflector associated with the imaging device;

measuring the peak amplitude of the reflected infrared signal during transmission of the infrared signal by the imaging assembly; and responsive to a separate system determining an absence of an object interference with a beam path of the infrared light extending from the infrared illumination source to the reflector, determining a health condition of the imaging assembly.

10. The method of claim 9, wherein the separate system is a weigh platter of the imaging assembly, the method further comprising determining the absence of the object by analyzing weigh data captured by the weigh platter during the transmission of the infrared signal.

* * * * *